(12) United States Patent
Roos et al.

(10) Patent No.: US 12,027,675 B2
(45) Date of Patent: Jul. 2, 2024

(54) SYSTEM AND METHOD FOR RAPIDLY DISCHARGING A BATTERY CELL DURING A THERMAL EVENT

(71) Applicant: Polestar Performance AB, Gothenburg (SE)

(72) Inventors: Niklas Roos, Gothenburg (SE); Robert Wassmur, Gothenburg (SE)

(73) Assignee: POLESTAR PERFORMANCE AB, Gothenburg (SE)

( * ) Notice: Subject to any disclaimer, the term of this patent is extended or adjusted under 35 U.S.C. 154(b) by 133 days.

(21) Appl. No.: 17/534,079

(22) Filed: Nov. 23, 2021

(65) Prior Publication Data

US 2023/0163370 A1 May 25, 2023

(51) Int. Cl.
| | | |
|---|---|---|
| H01M 10/42 | (2006.01) | |
| H01M 10/052 | (2010.01) | |
| H01M 10/48 | (2006.01) | |
| H01M 10/625 | (2014.01) | |
| H01M 10/658 | (2014.01) | |
| H01M 50/204 | (2021.01) | |
| H01M 50/249 | (2021.01) | |

(52) U.S. Cl.
CPC ....... *H01M 10/425* (2013.01); *H01M 10/052* (2013.01); *H01M 10/482* (2013.01); *H01M 10/486* (2013.01); *H01M 10/625* (2015.04); *H01M 10/658* (2015.04); *H01M 50/204* (2021.01); *H01M 50/249* (2021.01); *H01M 2010/4271* (2013.01); *H01M 2200/10* (2013.01); *H01M 2200/20* (2013.01); *H01M 2220/20* (2013.01)

(58) Field of Classification Search
CPC ............ H01M 10/425; H01M 10/625; H01M 10/658; H01M 10/052; H01M 10/482; H01M 10/486; H01M 50/249; H01M 50/204
See application file for complete search history.

(56) References Cited

U.S. PATENT DOCUMENTS

2020/0280108 A1* 9/2020 Tomar ................. H01M 50/574
2023/0059778 A1* 2/2023 Zagrodnik .......... H01M 10/425

\* cited by examiner

*Primary Examiner* — Karie O'Neill Apicella
(74) *Attorney, Agent, or Firm* — Kilpatrick Townsend & Stockton LLP

(57) ABSTRACT

An electric vehicle battery pack configured to rapidly discharge one or more individual battery cells within a multi-cell battery arrangement to mitigate a propagation of a multi-cell thermal runaway event, the vehicle battery pack including a plurality of battery cells and a battery management system including sensing circuitry configured to sense one or more conditions of the plurality of battery cells, a processor configured to process data sensed by the sensing circuitry to determine whether any of the plurality of battery cells is experiencing the onset of a thermal runaway event, and a control engine configured to isolate and rapidly discharge a potential energy from a battery cell experiencing the onset of a thermal runaway event, thereby mitigating a potential for a propagation of a thermal runaway event experienced by a single cell into a multi-cell thermal runaway event.

20 Claims, 4 Drawing Sheets

SYSTEM AND METHOD FOR RAPIDLY DISCHARGING A BATTERY CELL DURING A THERMAL EVENT

TECHNICAL FIELD

The present disclosure relates generally to battery conditioning of an electric vehicle, and more particularly to a system and method of mitigating propagation of a thermal event in an energy storage system having a plurality of cells.

BACKGROUND

Electric vehicles are becoming increasingly popular as consumers look to decrease their environmental impact and improve air quality. Instead of a traditional internal combustion engine, electric vehicles include one or more motors, powered by a rechargeable battery pack. A common battery pack is made up of one or more battery modules, each module containing a plurality of battery cells, which act as galvanic cells when being discharged by converting chemical energy to electrical energy, and electrolytic cells when being recharged by converting electrical energy to chemical energy.

As is well known, these battery cells can generate heat in use, thus reducing the range of the electric vehicle and the durability and overall life of the battery cells making up the rechargeable battery pack. In rare cases, a single battery cell can overheat to the point of a thermal runaway, which can then propagate to the other battery cells and greatly reduce the longevity or the ability of the remaining cells to hold charge for an extended period of time. In extreme circumstances, the propagation of heat from the cell experiencing a thermal runaway can lead to a thermal runaway of the entire battery pack, thus destroying the battery pack and potentially the electric vehicle.

Although various systems have been developed over the years to regulate the temperature of the battery pack, further improvements in the ability to mitigate propagation of the thermal event for the use in a battery pack of an electric vehicle, and to decrease the chance that an overheated cell will affect any adjacent cell and/or the entire battery pack is desirable. The present disclosure addresses these concerns.

SUMMARY OF THE DISCLOSURE

Embodiments of the present disclosure provide systems and methods for mitigating propagation of a thermal event in an energy storage system having a plurality of cells by rapidly discharging the electrical potential from a battery cell prior to a perceived a thermal event. For example, in some embodiments, the disclosed systems and methods can isolate a battery cell experiencing the onset of a thermal event, then rapidly charge the electrical potential from the cell in a manner that decreases a likelihood of a propagation of heat from the cell to one or more adjacent cells within the battery pack.

One embodiment of the present disclosure provides an electric vehicle battery pack configured to rapidly discharge one or more individual battery cells within a multi-cell battery arrangement to mitigate a propagation of a multi-cell thermal runaway event, the vehicle battery pack including a plurality of battery cells, and a battery management system. The battery management system can include sensing circuitry configured to sense one or more conditions of the plurality of battery cells, a processor configured to process data sensed by the sensing circuitry to determine whether any of the plurality of battery cells is experiencing the onset of a thermal runaway event, and a control engine configured to isolate and rapidly discharge a potential energy from a battery cell experiencing the onset of a thermal runaway event, thereby mitigating a potential for a propagation of a thermal runaway event experienced by a single cell into a multi-cell thermal runaway event.

In one embodiment, the sensing circuitry is configured to sense at least one of a temperature, pressure, voltage, amperage, presence of smoke or liquid. In one embodiment, the sensing circuitry comprises a voltage monitoring module configured to receive voltage information associated with each of the plurality of battery cells as an aid in determining if any individual battery cell is experiencing the onset of a thermal runaway event. In one embodiment, the sensing circuitry comprises a balancing module configured to evaluate a relative voltage level between individual battery cells of the plurality battery cells, and to affect a transfer of electrical potential from one individual battery cell to one or more other individual battery cells within the plurality of battery cells. In one embodiment, the sensing circuitry comprises a temperature monitoring module configured to receive information corresponding to a temperature associated with an individual cell within the plurality of battery cells. In one embodiment, the sensing circuitry comprises a pressure monitoring module configured to receive information corresponding to a pressure associated with an individual cell within the plurality of battery cells. In one embodiment, the sensing circuitry comprises a thermocouple or pressure sensor.

In one embodiment, the processor is configured to determine if any individual battery cell within the plurality of battery cells is experiencing at least one of a temperature outside of the normal operating range, sudden rise in pressure, or abnormal voltage indicative of the onset of a thermal runaway event. In one embodiment, the processor uses a combination of a sensed temperature, pressure and voltage as an aid in determining whether an individual battery cell within the plurality of battery cells is experiencing the onset of a thermal runaway. In one embodiment, the control engine is configured to discharge the potential energy from a battery cell experiencing the onset of a thermal runaway event into at least one of other battery cells within the plurality of battery cells or an electrically resistive member. In one embodiment, one or more high temperature barricades are positioned between adjacent cells of the plurality of cells, the high temperature barricades configured to inhibit heat propagation between adjacent cells.

Another embodiment of the present disclosure provides a battery management system configured to rapidly discharge one or more individual battery cells within a multi-cell battery arrangement mitigate propagation of a multi celled thermal runaway event, the battery management system including sensing circuitry configured to sense one or more conditions in each of a plurality of battery cells within a multi-cell battery arrangement, a processor configured to process data sensed by the sensing circuitry to determine whether any of the plurality of battery cells is experiencing the onset of a thermal runaway event, and a control engine configured to isolate and rapidly discharge a potential energy from a battery cell experiencing the onset of a thermal runaway event, thereby mitigating a potential for a propagation of a thermal runaway event experienced by a single cell into a multi-cell thermal runaway event.

Another embodiment of the present disclosure provides an electric vehicle having a battery pack configured to rapidly discharge one or more individual battery cells within a multi-cell battery arrangement to mitigate a propagation of a multi-cell thermal runaway event, the electric vehicle including a battery tray comprising a plurality of battery cells in a multi-cell arrangement, with one or more high temperature barricades positioned between adjacent cells of the plurality of cells configured to inhibit heat propagation between adjacent cells, and a battery management system including sensing circuitry configured to sense one or more conditions of the plurality of battery cells, wherein the sensing circuitry is configured to sense at least one of a temperature, pressure, voltage associated with an individual cell within the plurality of battery cells, the sensing circuitry, including a voltage monitoring module configured to receive voltage information associated with each of the plurality of battery cells as an aid in determining if any individual battery cell is experiencing the onset of a thermal runaway event, a balancing module configured to evaluate a relative voltage level between individual battery cells of the plurality battery cells, and to affect a transfer of electrical potential from one individual battery cell to one or more other individual battery cells within the plurality of battery cells, a temperature monitoring module configured to receive information corresponding to a temperature associated with an individual cell within the plurality of battery cells, and a pressure monitoring module configured to receive information corresponding to a pressure associated with an individual cell within the plurality of battery cells, a processor configured to process data sensed by the sensing circuitry to determine whether any of the plurality of battery cells is experiencing the onset of a thermal runaway event, and a control engine configured to isolate and rapidly discharge a potential energy from a battery cell experiencing the onset of a thermal runaway event, thereby mitigating a potential for a propagation of a thermal runaway event experienced by a single cell into a multi-cell thermal runaway event, wherein the control engine is configured to discharge the potential energy from a battery cell experiencing the onset of a thermal runaway event into at least one of other battery cells within the plurality of battery cells or an electrically resistive member.

The summary above is not intended to describe each illustrated embodiment or every implementation of the present disclosure. The figures and the detailed description that follow more particularly exemplify these embodiments.

BRIEF DESCRIPTION OF THE DRAWINGS

The disclosure can be more completely understood in consideration of the following detailed description of various embodiments of the disclosure, in connection with the accompanying drawings, in which.

Figure 1:
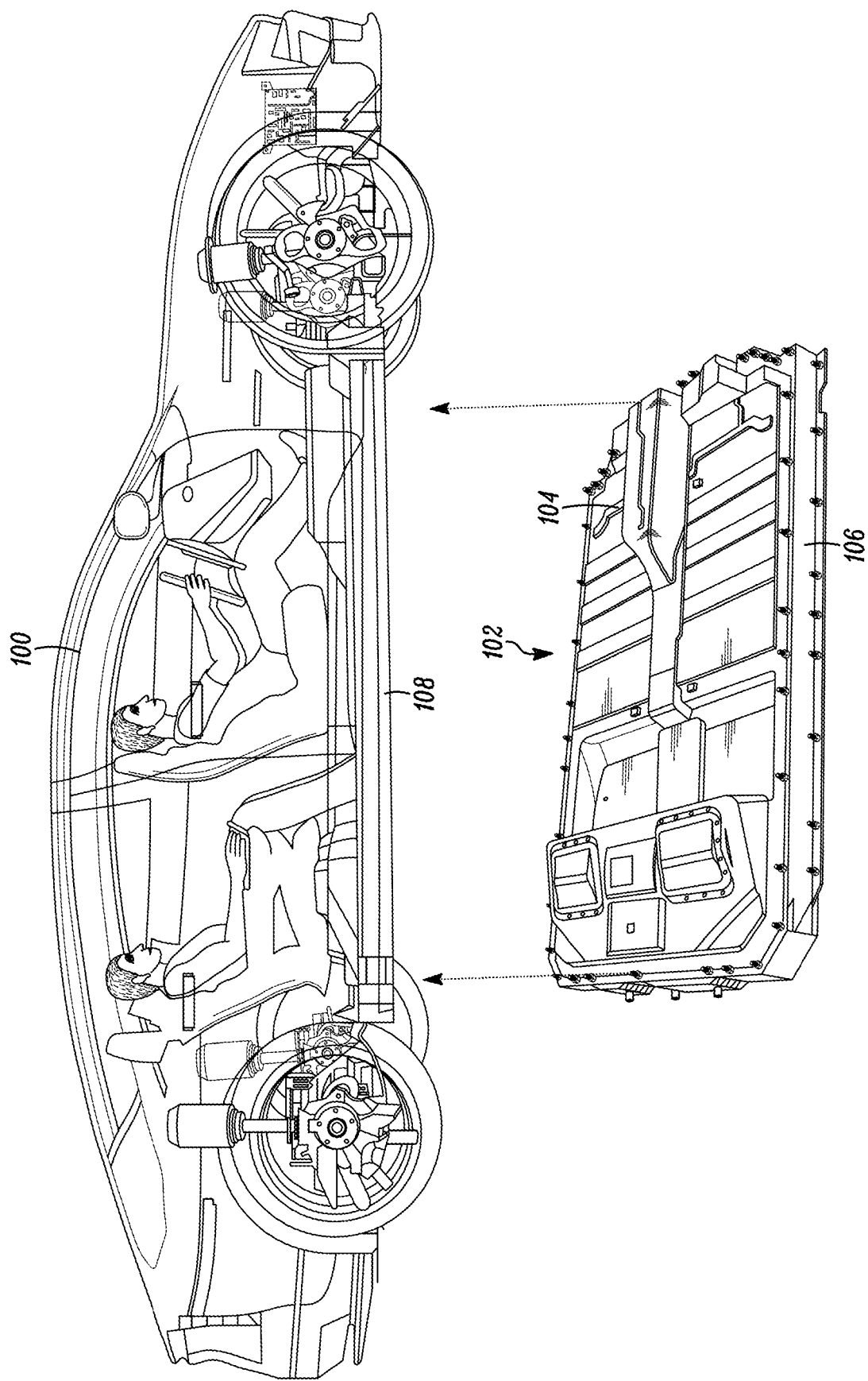
FIG. 1 is a perspective view depicting an electric vehicle comprising a battery pack configured to rapidly discharge one or more individual battery cells within a multi-cell battery arrangement to mitigate the propagation of a multi-cell thermal runaway event in accordance with an embodiment of the disclosure.

While embodiments of the disclosure are amenable to various modifications and alternative forms, specifics thereof shown by way of example in the drawings will be described in detail. It should be understood, however, that the intention is not to limit the disclosure to the particular embodiments described. On the contrary, the intention is to cover all modifications, equivalents, and alternatives falling within the spirit and scope of the subject matter as defined by the claims.

DETAILED DESCRIPTION

Referring to FIG. 1, an electric vehicle 100 comprising a battery pack 102 for rapidly discharging one or more individual battery cell within a multi-cell battery arrangement to mitigate a propagation of a multi-cell thermal runaway event is depicted in accordance with an embodiment of the disclosure. As depicted in FIG. 1, the battery pack 102 can include a cover 104 operably coupled to a battery tray 106, thereby creating a sealed battery cell compartment containing clusters of individual battery cells and other battery related components. The assembled battery pack 102 can then be mounted to the frame and/or chassis of the vehicle 100, which in some embodiments can be positioned adjacent to a cabin floor 108 of the vehicle 100, thereby maintaining a low center of gravity.

Various embodiments of the present disclosure will be described in detail with reference to the drawings, wherein like reference numerals represent like parts and assemblies throughout the several views. Various directions and orientations, such as "upward," "downward," "top," "bottom," "upper," "lower", etc. are generally described herein with reference to the drawings in the usual gravitational frame of reference, regardless of how the components may be oriented during assembly.

Figure 2:
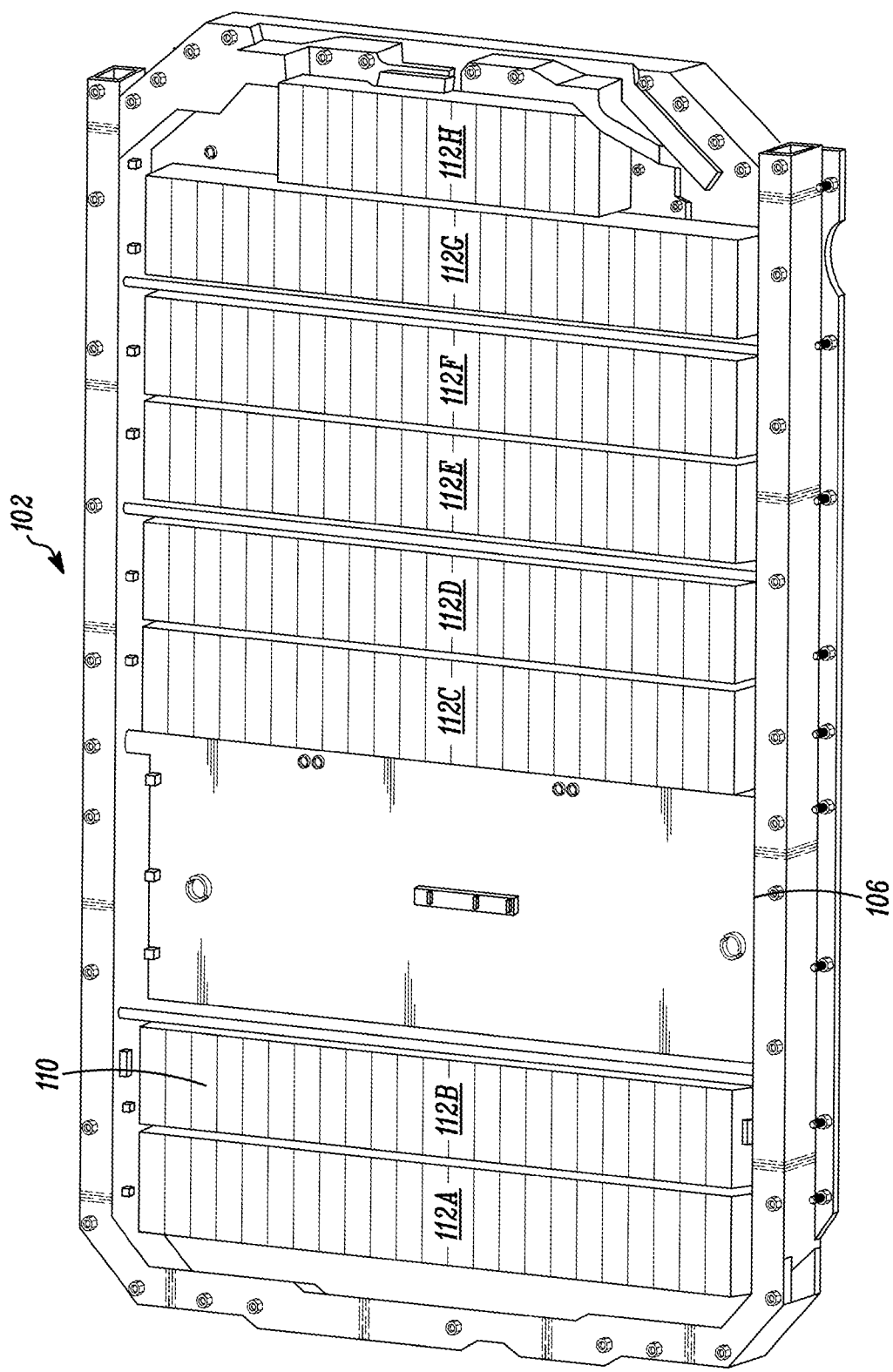
FIG. 2 is a perspective view depicting a multi-cell battery pack configured to enable rapid discharge of one or more individual battery cells to mitigate heat propagation to adjacent battery cells or battery modules in accordance with an embodiment of the disclosure.

With additional reference to FIG. 2, a multi-cell battery pack 102 configured to enable rapid discharge of one or more individual battery cells 110 to mitigate heat propagation to adjacent battery cells 110 or battery modules 112 is depicted in accordance with an embodiment of the disclosure. As depicted, the individual cells 110 are grouped into eight distinct clusters, sometimes referred to as battery modules 112 A-H although the grouping of the individual cells 110 into other quantities of clusters of varying shapes and sizes is also contemplated. In addition to the modules 112, the battery pack 102 can include one or more electrical current transmission systems, temperature control systems, safety systems, battery management systems (BMS), and structural support systems (in addition to the structural support provided by the battery tray 106 itself).

It has been observed that optimal battery cell 110 performance is more likely to occur within a desired temperature range (e.g., 40-45° C., etc.), with a maximum/not to exceed temperature (e.g., 60° C.) being above the desired temperature range. In rare cases, individual battery cells 110 within a multi-cell battery pack 102 can exhibit thermal characteristics above a desired temperature range (e.g., above the maximum/not to exceed temperature), which may result in a failure (e.g., thermal runaway, etc.) of the individual cell 110. During such an occurrence, heat energy from the cell 110 exhibiting the thermal characteristics can propagate into nearby and adjacent cells 110, thereby creating the potential for a chain reaction thermal event across multiple battery cells 110.

The multi-cell battery pack 102 has many sources of heat which may contribute to abnormal thermal characteristics of any given cell 110 (e.g., above a desired temperature range). The source of heat may be created internally (e.g., within the cell 110) or may originate from an external source (e.g., outside of the cell 110 or battery tray 106). One internal heat source can occur when one or more individual cells 110 experience a high rate of discharge, which may occur when the vehicle 100 is under heavy acceleration and/or driving up a hill, etc. This type of internal heat is considered part of the normal operation of the vehicle 110, but is monitored for exceptional circumstances, which may occur during extremely hot weather or other predetermined or unforeseen circumstances. Abnormal thermal characteristics within an individual cell 110 can also occur as a result of internal damage (e.g., impact, crushing, etc.), which can result in a thermal runaway.

The heat produced by a high rate of discharge within an individual cell 110 is generally a function of an electrical current and an internal electrical resistance of the cell 110. The cells 110 are generally more sensitive to high temperatures when a voltage within the cell is relatively high. This volatility is dependent upon cell chemistry (e.g., nickel-cadmium reaction, etc.) and varies among different types of cells 110 contemplated for use. In the event that a single cell 110 may enter into a thermal runaway, the heat produced by the overheated cell 110 may transfer to adjacent cells 110 (e.g., within a module 112) thereby raising the temperature of the adjacent cells 110 to a point the propagation of the thermal event throughout the entire battery pack 102.

To inhibit such a chain reaction thermal event, the battery pack 102 can be closely monitored and controlled to inhibit such thermal runaway of any single cell 110 for the purpose of inhibiting a larger order thermal runaway, from the cell 110 experiencing the over temperature conditions into adjacent cells 110, which may be positioned either radially, axially or nearby. With optimal performance in mind, embodiments of the present disclosure enable a rapid discharge of the individual battery cell 110 experiencing an onset of a detected thermal runaway event (e.g., temperature above a defined threshold, rapid rise in temperature above a defined rate, sudden change in pressure, abnormal current or voltage readings, the presence of smoke, etc.), such that the thermal runaway or propagation may be slowed, such that the rate of propagation to other cells 110 within the multi-cell battery pack 102 can be completely stopped or slowed.

Figure 3:
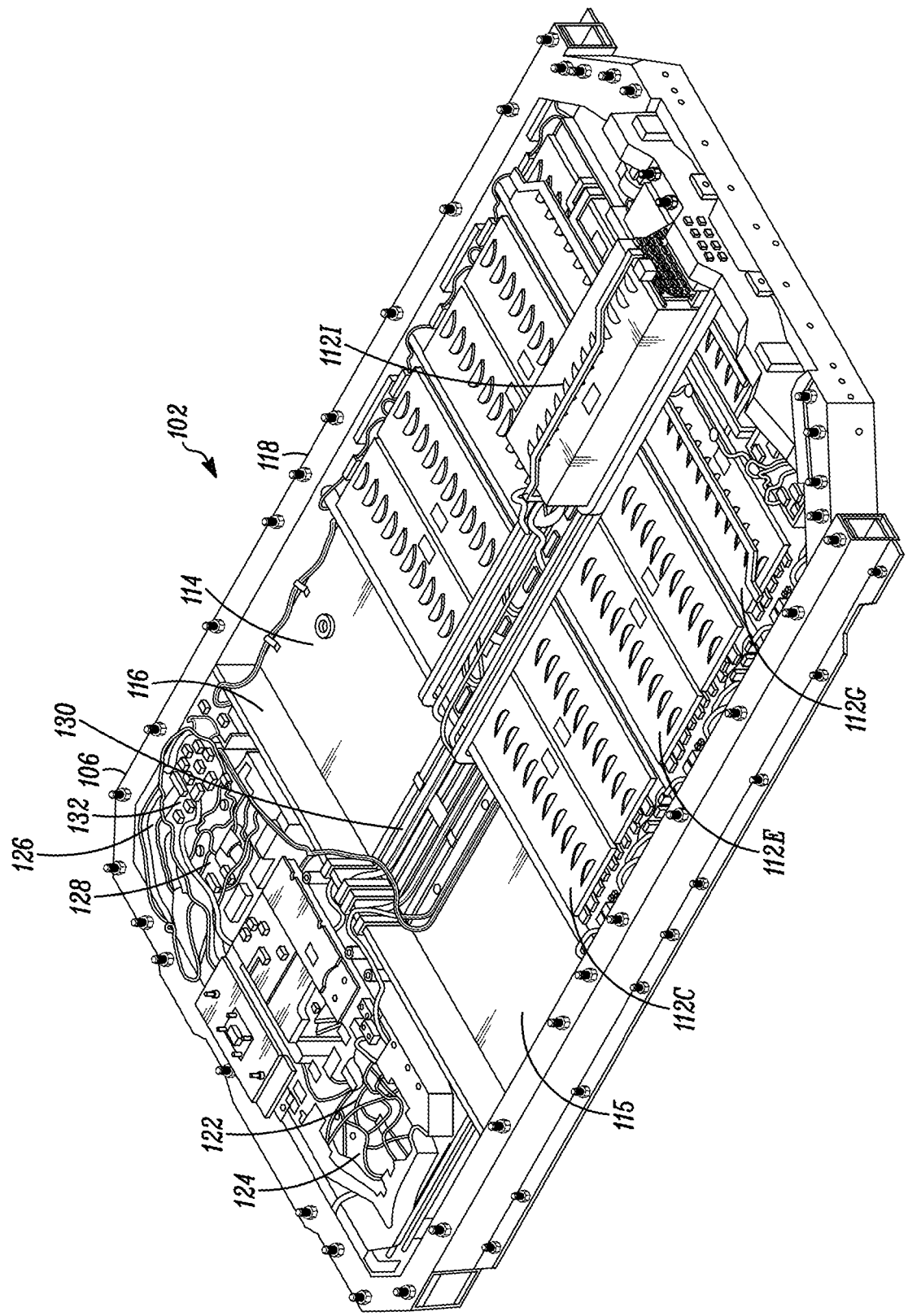
FIG. 3 is a perspective view depicting a vehicle battery pack tray loaded with a plurality of battery pack components configured to enable rapid discharge of one or more individual battery cells to mitigate the propagation of a multi-cell thermal runaway event, in accordance with an embodiment of the disclosure.

With additional reference to FIG. 3, a multi-cell battery pack 102 configured to enable rapid discharge of one or more individual battery cells to mitigate the propagation of a multi-cell thermal runaway event is depicted in accordance with an embodiment of the disclosure. As depicted, the battery tray 106 can represent a bottom and one or more sides of a structural vessel 114 defining a compartment 115. Further, in embodiments, the battery tray 106 can include one or more structural supports, such as cross members 116, which can provide structural support to the battery pack 102, as well as surfaces within the compartment 115 on which other components of the battery pack can be affixed.

In addition to the battery modules 112A-I, a variety of components can be packed into the compartment 115 before the cover 104 (as depicted in FIG. 1) is affixed to a top surface 118 of the battery tray 106, thereby sealing the compartment 114. In some embodiments, the components can include an electrical current transmission system 122, safety system 124, battery management system 126 (including current management systems 128), and a battery bus bar 130 interconnecting the various components 112A-I, 122, 124, 126, and 128. Once the components have been positioned within the compartment 115, the cover 104 can be affixed to the top surface 118 via a plurality of fasteners, adhesive, or a combination thereof.

In some embodiments, the battery management system 126 or other components of the multi-cell battery pack can include one or more sensors 132 for monitoring a physical state of the individual cells 110 during operation. Such sensors include, but are not limited to measurement of temperature, pressure, voltage, amperage, and other ambient conditions (e.g., the presence of smoke or fumes, the presence of liquid, etc.) within the battery tray 106. Data from the sensors 132 can then be used by hardware and software to make intelligent decisions to control a temperature of the individual cells 110, so that the temperature within any individual cell 110 stays within an acceptable operating range. Additionally, the battery management system 126, sometimes in combination with the electrical current transmission system 122, can be configured to enable information gathered by the one or more sensors 132 to flow into and out of the battery pack 102. The battery management system 126 can include mixed signal integrated circuits that incorporate both analog and digital circuits, such as one or more types of digital memory and special registers to hold battery data.

Figure 4:
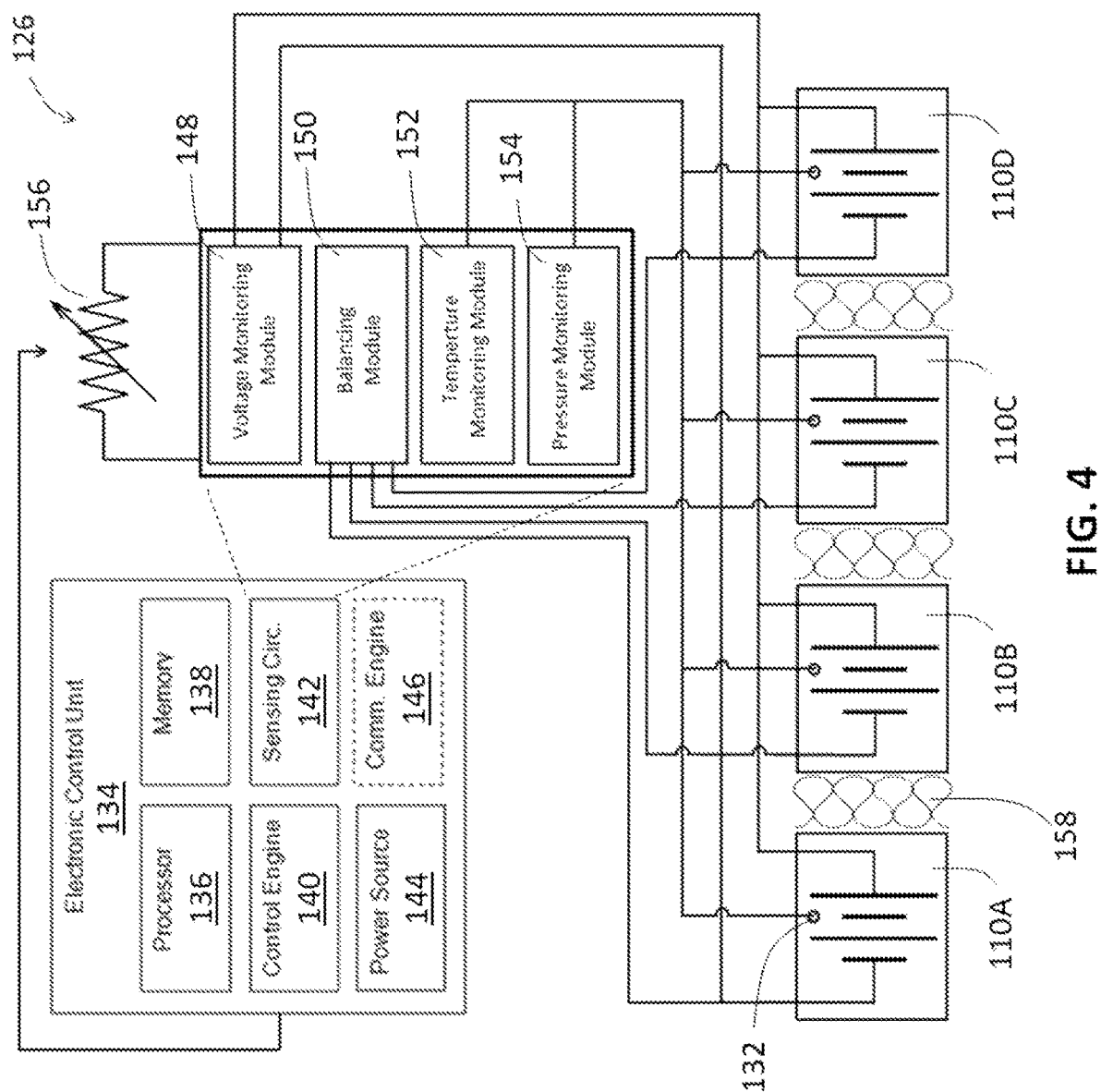
FIG. 4 is a block diagram depicting a battery management system adapted to rapidly discharge one or more individual battery cells within a multi-cell battery arrangement to mitigate the propagation of a multi-cell thermal runaway event in accordance with an embodiment of the disclosure.

With additional reference to FIG. 4, a block diagram for a battery management system 126 adapted to rapidly discharge one or more individual battery cells within a multi-cell battery arrangement to mitigate a propagation of a multi-cell thermal runaway event is depicted in accordance with an embodiment of the disclosure. As depicted, the battery management system 126 can include an electronic control unit (ECU) 134 operably coupled to a plurality of energy delivery devices (e.g., individual cells 100A-D (e.g., lithium cells), electrically connected in series and/or in parallel.

The ECU 134 or components thereof can comprise or include various modules or engines, each of which is constructed, programmed, configured, or otherwise adapted to autonomously carry out a function or set of functions. The term "engine" as used herein is defined as a real-world device, component, or arrangement of components implemented using hardware, such as by an application specific integrated circuit (ASIC) or field programmable gate array (FPGA), for example, or as a combination of hardware and software, such as by a microprocessor system and a set of program instructions that adapt the engine to implement the particular functionality, which (while being executed) transform the microprocessor system into a special-purpose device.

An engine can also be implemented as a combination of the two, with certain functions facilitated by hardware alone, and other functions facilitated by a combination of hardware and software. In certain implementations, at least a portion, and in some cases, all, of an engine can be executed on the processor(s) of one or more computing platforms that are made up of hardware (e.g., one or more processors, data storage devices such as memory or drive storage, input/output facilities such as network interface devices, video devices, keyboard, mouse or touchscreen devices, etc.) that execute an operating system, system programs, and application programs, while also implementing the engine using multitasking, multithreading, distributed (e.g., cluster, peer-peer, cloud, etc.) processing where appropriate, or other such techniques.

Accordingly, each engine can be realized in a variety of physically realizable configurations, and should generally not be limited to any particular implementation exemplified herein, unless such limitations are expressly called out. In addition, an engine can itself be composed of more than one sub-engines, each of which can be regarded as an engine in its own right. Moreover, in the embodiments described herein, each of the various engines corresponds to a defined autonomous functionality; however, it should be understood that in other contemplated embodiments, each functionality can be distributed to more than one engine. Likewise, in other contemplated embodiments, multiple defined functionalities may be implemented by a single engine that performs those multiple functions, possibly alongside other functions, or distributed differently among a set of engines than specifically illustrated in the examples herein.

In some embodiments, ECU 134 can include a processor 136, memory 138, control engine 140, sensing circuitry 142, and power source 144. Optionally, in embodiments, ECU 134 can further include a communications engine 146. Processor 136 can include fixed function circuitry and/or programmable processing circuitry. Processor 136 can include any one or more of a microprocessor, a controller, a DSP, an ASIC, an FPGA, or equivalent discrete or analog logic circuitry. In some examples, processor 136 can include multiple components, such as any combination of one or more microprocessors, one or more controllers, one or more DSPs, one or more ASICs, or one or more FPGAs, as well as other discrete or integrated logic circuitry. The functions attributed to processor 136 herein may be embodied as software, firmware, hardware or any combination thereof.

Memory 138 can include computer-readable instructions that, when executed by processor 136 cause ECU 134 to perform various functions. Memory 138 can include volatile, non-volatile, magnetic, optical, or electrical media, such as a random access memory (RAM), read-only memory (ROM), non-volatile RAM (NVRAM), electrically-erasable programmable ROM (EEPROM), flash memory, or any other digital media.

Control engine 140 can include instructions to control the components of ECU 134 and instructions to selectively control a flow of electrical power to and from the individual cells 110A-D, thereby enabling both a rapid discharge of any one individual cell 110A-D experiencing abnormal conditions, as well as a balancing of loads between cells 110A-D. For example, based on conditions detected by the sensing circuitry 142 or the vehicle (e.g. other vehicle ECUs), control engine 140 can selectively activate (e.g., open/close) one or more switches to adjust a connection to each of the cells 110A-D individually. In some cases, it may be desirable to shift an electrical potential between one or more cells 110A-D. In other cases, it may be desirable to rapidly discharge the electrical potential from a given cell, for example through an electrically resistive member 156, which in some embodiments, may have a variable resistance or impedance controllable by the control engine 140. For example, in one embodiment, the resistive member 156 can be the vehicle motor; although the use of other resistive members or combinations of resistive members is also contemplated.

In embodiments, sensing circuitry 142 can be configured to sense a variety of conditions related to each of the cells 110A-D. For example, sensing circuitry 142 can be configured to sense at least one of a temperature, pressure, voltage, amperage, or other ambient condition (e.g., the presence of smoke or fumes, the presence of liquid, etc.) directly or indirectly associated with each cell 110A-D. Accordingly, sensing circuitry 142 can include or can be operable with one or more sensors 132 (e.g., one or more thermocouples, pressure sensors, etc.). In embodiments, sensing circuitry 142 can additionally include one or more modules 148, 150, 152, 154 configured to process and analyze received data related to battery cell 110A-D conditions.

For example, a voltage monitoring module 148 can be configured to receive voltage information associated with each of the individual battery cells 110A-D, condition and isolate the voltage information and provide the voltage information to the processor 136/control engine 140. The processor 136 can evaluate each of the battery cells 110 A-D during operation (e.g., charging and discharging) to determine if any individual battery cell 110A-D is in a potentially damaging state. For example, during charging, an individual cell 110A-D may reach or exceed a safe voltage level even though the overall pack voltage is still below a safe level. Similarly, during discharge, the voltage of an individual cell 110A-D may drop below a minimum safety threshold even though the voltage of the overall battery pack is still above its minimum safety threshold. In such events, the control engine 140 can discontinue charging or discharging the battery pack 102 (or anyone of the individual cells 110A-D) when the processor 136 detects an individual cell 110A-D voltage at an undesired value.

Some exemplary parameters that can be monitored by the battery management system 126 include overcharge (over-voltage), over-discharge (under-voltage) and excessive charge and discharge currents (overcurrent, short circuit), information of particular importance in Li-ion battery systems. In some embodiments, the battery management system 126 can assume some of the functions of a protection circuit by protecting individual cells 110A-D from harmful over-charging and overcurrent conditions.

A balancing module 150 can be configured to evaluate the relative voltage levels of adjacent cell 110A-D pairs and redistribute charge between the adjacent cells 110A-D to mitigate differences in the cell voltages of the pair. That is, in rare cases, the individual cells 110 within a given module may discharge unevenly, creating a temperature and voltage differential among the cells 110A-D. Upon the detection of such an event, the balancing module 150 can affect the transfer of electrical potential from one cell to another, and in extreme circumstances can even fully discharge the electrical potential from a given cell experiencing a problem or perceived abnormal conditions. To affect a greater control over redistribution of electrical potential, in some embodiments, the balancing module 150 can employ one or more resistors 156, which can be variable in nature, to shift the electrical load of one or more cells to other cells within the battery 102.

A temperature monitoring module 152 can receive information corresponding to a temperature of the individual cells 110A-D. Accordingly, in some embodiments, the sensing circuitry 142 can monitor a temperature of the individual battery cells 110A-D with a goal of maintaining the active cells within a desired temperature range. The temperature information can be in the form of an electrical signal produced by a sensor 132 located within or adjacent to the individual cells 110A-D, although the temperature information can take other forms known in the art. The temperature monitoring module 152 can provide the temperature information to the processor 136/control engine 140.

If it is determined by the processor 136 that a temperature of at least one of the cells 110 has risen above the desired temperature range, the control engine 140 can open/close one or more switches to route a flow of electrical energy within the bus bar to affect a load shift or rapid discharge of the cell experiencing the abnormal condition. Temperature control can also be afforded via one or more high temperature barricades 158. In some embodiments, these high temperature barricades 158 can be in the form of insulation constructed of a material configured to provide a physical heat barrier to inhibit heat propagation between adjacent cells 110 within the multi-cell battery pack 102.

The pressure monitoring module 154 can receive information corresponding to a pressure within or in close proximity to individual cells 110A-D. Accordingly, in some embodiments, the sensing circuitry 142 can monitor a pressure of the individual battery cells 110A-D with a goal of using the pressure information (potentially in combination with the sensed temperature, voltage, etc.) as an aid in determining whether anyone of the individual cells 110A-D may be experiencing a problem, and may be likely to experience a thermal runaway or other adverse event in the near future. In some embodiments, the pressure information can be in the form of an electrical signal produced by a sensor 132, which can then be fed to the processor 136/control engine to affect a load shift or rapid discharge of the cell experiencing the abnormal condition.

Power source 144 is configured to deliver operating power to the components of ECU 134. Power source 144 can include a battery and a power generation circuit to produce the operating power (e.g., individual battery cells 110, etc.). In some examples, the power source 144 is rechargeable to allow extended operation. Power source 144 can include any one or more of a plurality of different battery types, such as nickel cadmium batteries, lithium ion batteries and the like.

Optionally, communications engine 146 can include any suitable hardware, firmware, software, or any combination thereof for communicating with other components of the vehicle and/or external devices (e.g., charging station, etc.). Under the control of processor 136, communication engine 146 can receive downlink telemetry from, as well as send uplink telemetry to one or more external devices using an internal or external antenna. In addition, communication engine 146 can facilitate communication with a networked computing device and/or a computer network.

For example, in some embodiments, the communications engine 146 can be configured to receive information from a driver regarding a desired travel route (e.g., including a desired departure time and en route travel time); for example, in some embodiments, the desired travel route can be obtained from the vehicle's navigation unit (e.g., GPS). In some embodiments, communication engine 146 can additionally be configured to receive or autonomously gather weather data, including an expected ambient environmental temperature along the desired travel route. This information can be used by the battery management system 126 to anticipate energy usage and discharge requirements along the desired route, thereby enabling the battery management system 126 to compare actual, sensed conditions of the individual cells 110A-D to expected conditions of the individual cells for a given environmental temperature along the travel route.

The invention is further illustrated by the following embodiments:

An electric vehicle battery pack configured to rapidly discharge one or more individual battery cells within a multi-cell battery arrangement to mitigate a propagation of a multi-cell thermal runaway event, the vehicle battery pack comprising: a plurality of battery cells; and a battery management system comprising—sensing circuitry configured to sense one or more conditions of the plurality of battery cells, a processor configured to process data sensed by the sensing circuitry to determine whether any of the plurality of battery cells is experiencing the onset of a thermal runaway event, and a control engine configured to isolate and rapidly discharge a potential energy from a battery cell experiencing the onset of a thermal runaway event, thereby mitigating a potential for a propagation of a thermal runaway event experienced by a single cell into a multi-cell thermal runaway event.

A system or method according to any embodiment, wherein the sensing circuitry is configured to sense at least one of a temperature, pressure, voltage, amperage, presence of smoke or liquid.

A system or method according to any embodiment, wherein the sensing circuitry comprises a voltage monitoring module configured to receive voltage information associated with each of the plurality of battery cells as an aid in determining if any individual battery cell is experiencing the onset of a thermal runaway event.

A system or method according to any embodiment, wherein the sensing circuitry comprises a balancing module configured to evaluate a relative voltage level between individual battery cells of the plurality battery cells, and to affect a transfer of electrical potential from one individual battery cell to one or more other individual battery cells within the plurality of battery cells.

A system or method according to any embodiment, wherein the sensing circuitry comprises a temperature monitoring module configured to receive information corresponding to a temperature associated with an individual cell within the plurality of battery cells.

A system or method according to any embodiment, wherein the sensing circuitry comprises a pressure monitoring module configured to receive information corresponding to a pressure associated with an individual cell within the plurality of battery cells.

A system or method according to any embodiment, wherein the sensing circuitry comprises a thermocouple or pressure sensor.

A system or method according to any embodiment, wherein the processor is configured to determine if any individual battery cell within the plurality of battery cells is experiencing at least one of a temperature outside of the normal operating range, sudden rise in pressure, or abnormal voltage indicative of the onset of a thermal runaway event.

A system or method according to any embodiment, wherein the processor uses a combination of a sensed temperature, pressure and voltage as an aid in determining whether an individual battery cell within the plurality of battery cells is experiencing the onset of a thermal runaway.

A system or method according to any embodiment, wherein the control engine is configured to discharge the potential energy from a battery cell experiencing the onset of a thermal runaway event into at least one of other battery cells within the plurality of battery cells or an electrically resistive member.

A system or method according to any embodiment, wherein one or more high temperature barricades are positioned between adjacent cells of the plurality of cells ( ), the high temperature barricades configured to inhibit heat propagation between adjacent cells.

An electric vehicle comprising the electric vehicle battery pack according to any embodiment of the disclosure.

Various embodiments of systems, devices, and methods have been described herein. These embodiments are given only by way of example and are not intended to limit the scope of the claimed inventions. It should be appreciated, moreover, that the various features of the embodiments that have been described may be combined in various ways to produce numerous additional embodiments. Moreover, while various materials, dimensions, shapes, configurations and locations, etc. have been described for use with disclosed embodiments, others besides those disclosed may be utilized without exceeding the scope of the claimed inventions.

Persons of ordinary skill in the relevant arts will recognize that the subject matter hereof may comprise fewer features than illustrated in any individual embodiment described above. The embodiments described herein are not meant to be an exhaustive presentation of the ways in which the various features of the subject matter hereof may be combined. Accordingly, the embodiments are not mutually exclusive combinations of features; rather, the various embodiments can comprise a combination of different individual features selected from different individual embodiments, as understood by persons of ordinary skill in the art. Moreover, elements described with respect to one embodiment can be implemented in other embodiments even when not described in such embodiments unless otherwise noted.

Although a dependent claim may refer in the claims to a specific combination with one or more other claims, other embodiments can also include a combination of the dependent claim with the subject matter of each other dependent claim or a combination of one or more features with other dependent or independent claims. Such combinations are proposed herein unless it is stated that a specific combination is not intended.

Any incorporation by reference of documents above is limited such that no subject matter is incorporated that is contrary to the explicit disclosure herein. Any incorporation by reference of documents above is further limited such that no claims included in the documents are incorporated by reference herein. Any incorporation by reference of documents above is yet further limited such that any definitions provided in the documents are not incorporated by reference herein unless expressly included herein.

For purposes of interpreting the claims, it is expressly intended that the provisions of 35 U.S.C. § 112(f) are not to be invoked unless the specific terms "means for" or "step for" are recited in a claim.

What is claimed is:

1. An electric vehicle battery pack configured to rapidly discharge one or more individual battery cells within a multi-cell battery arrangement to mitigate a propagation of a multi-cell thermal runaway event, the electric vehicle battery pack comprising:
   a plurality of battery cells; and
   a battery management system comprising:
      sensing circuitry configured to sense one or more conditions of the plurality of battery cells,
      a processor configured to process data sensed by the sensing circuitry to determine whether any of the plurality of battery cells is experiencing an onset of a thermal runaway event, and
      a control engine configured to isolate and rapidly discharge a potential energy from a battery cell experiencing the onset of the thermal runaway event, thereby mitigating a potential for the propagation of the thermal runaway event experienced by a single cell into a multi-cell thermal runaway event.

2. The electric vehicle battery pack of claim 1, wherein the sensing circuitry is configured to sense at least one of a temperature, pressure, voltage, amperage, presence of smoke or liquid.

3. The electric vehicle battery pack of claim 1, wherein the sensing circuitry comprises a voltage monitoring module configured to receive voltage information associated with each of the plurality of battery cells as an aid in determining if any individual battery cell is experiencing the onset of the thermal runaway event.

4. The electric vehicle battery pack of claim 1, wherein the sensing circuitry comprises a balancing module configured to evaluate a relative voltage level between individual battery cells of the plurality of battery cells, and to affect a transfer of electrical potential from one individual battery cell to one or more other individual battery cells within the plurality of battery cells.

5. The electric vehicle battery pack of claim 1, wherein the sensing circuitry comprises a temperature monitoring module configured to receive information corresponding to a temperature associated with an individual cell within the plurality of battery cells.

6. The electric vehicle battery pack of claim 1, wherein the sensing circuitry comprises a pressure monitoring module configured to receive information corresponding to a pressure associated with an individual cell within the plurality of battery cells.

7. The electric vehicle battery pack of claim 1, wherein the sensing circuitry comprises a thermocouple or pressure sensor.

8. The electric vehicle battery pack of claim 1, wherein the processor is configured to determine if any individual battery cell within the plurality of battery cells is experiencing at least one of a temperature outside of a normal operating range, sudden rise in pressure, or abnormal voltage indicative of the onset of the thermal runaway event.

9. The electric vehicle battery pack of claim 1, wherein the processor uses a combination of a sensed temperature, pressure and voltage as an aid in determining whether an individual battery cell within the plurality of battery cells is experiencing the onset of a thermal runaway.

10. The electric vehicle battery pack of claim 1, wherein the control engine is configured to discharge the potential energy from the battery cell experiencing the onset of the thermal runaway event into at least one of other battery cells within the plurality of battery cells or an electrically resistive member.

11. The electric vehicle battery pack of claim 1, wherein one or more high temperature barricades are positioned between adjacent cells of the plurality of battery cells, the high temperature barricades configured to inhibit heat propagation between adjacent cells.

12. A battery management system configured to rapidly discharge one or more individual battery cells within a multi-cell battery arrangement to mitigate propagation of a multi celled thermal runaway event, the battery management system comprising:
   sensing circuitry configured to sense one or more conditions in each of a plurality of battery cells within the multi-cell battery arrangement;
   a processor configured to process data sensed by the sensing circuitry to determine whether any of the plurality of battery cells is experiencing an onset of a thermal runaway event; and
   a control engine configured to isolate and rapidly discharge a potential energy from a battery cell experiencing the onset of the thermal runaway event, thereby mitigating a potential for a propagation of the thermal runaway event experienced by a single cell into a multi-cell thermal runaway event.

13. The battery management system of claim 12, wherein the sensing circuitry comprises a voltage monitoring module configured to receive voltage information associated with each of the plurality of battery cells as an aid in determining if any individual battery cell is experiencing the onset of the thermal runaway event.

14. The battery management system of claim 12, wherein the sensing circuitry comprises a balancing module configured to evaluate a relative voltage level between individual battery cells of the plurality of battery cells, and to affect a transfer of electrical potential from one individual battery cell to one or more other individual battery cells within the plurality of battery cells.

15. The battery management system of claim 12, wherein the sensing circuitry comprises a temperature monitoring module configured to receive information corresponding to a temperature associated with an individual cell within the plurality of battery cells.

16. The battery management system of claim 12, wherein the sensing circuitry comprises a pressure monitoring module configured to receive information corresponding to a pressure associated with an individual cell within the plurality of battery cells.

17. The battery management system of claim 12, wherein the processor is configured to determine if any individual battery cell within the plurality of battery cells is experiencing at least one of a temperature outside of a normal operating range, sudden rise in pressure, or abnormal voltage indicative of the onset of the thermal runaway event.

18. The battery management system of claim 12, wherein the control engine is configured to discharge the potential energy from the battery cell experiencing the onset of the thermal runaway event into at least one of other battery cells within the plurality of battery cells or an electrically resistive member.

19. The battery management system of claim 12, wherein one or more high temperature barricades are positioned between adjacent cells of the plurality of battery cells, the high temperature barricades configured to inhibit heat propagation between adjacent cells.

20. An electric vehicle having a battery pack configured to rapidly discharge one or more individual battery cells within a multi-cell battery arrangement to mitigate a propagation of a multi-cell thermal runaway event, the electric vehicle comprising:

a battery tray comprising a plurality of battery cells in a multi-cell arrangement, with one or more high temperature barricades positioned between adjacent cells of the plurality of battery cells configured to inhibit heat propagation between adjacent cells; and a battery management system comprising:
  sensing circuitry configured to sense one or more conditions of the plurality of battery cells, wherein the sensing circuitry is configured to sense at least one of a temperature, pressure, voltage associated with an individual cell within the plurality of battery cells, the sensing circuitry comprising:
    a voltage monitoring module configured to receive voltage information associated with each of the plurality of battery cells as an aid in determining if any individual battery cell is experiencing an onset of a thermal runaway event;
    a balancing module configured to evaluate a relative voltage level between individual battery cells of the plurality of battery cells, and to affect a transfer of electrical potential from one individual battery cell to one or more other individual battery cells within the plurality of battery cells;
    a temperature monitoring module configured to receive information corresponding to the temperature associated with the individual cell within the plurality of battery cells; and
    a pressure monitoring module configured to receive information corresponding to a pressure associated with the individual cell within the plurality of battery cells;
  a processor configured to process data sensed by the sensing circuitry to determine whether any of the plurality of battery cells is experiencing the onset of the thermal runaway event; and
  a control engine configured to isolate and rapidly discharge a potential energy from a battery cell experiencing the onset of the thermal runaway event, thereby mitigating a potential for the propagation of the thermal runaway event experienced by a single cell into a multi-cell thermal runaway event, wherein the control engine is configured to discharge the potential energy from the battery cell experiencing the onset of the thermal runaway event into at least one of other battery cells within the plurality of battery cells or an electrically resistive member.

\* \* \* \* \*